(12) United States Patent
Bellekens et al.

(10) Patent No.: US 11,968,596 B2
(45) Date of Patent: Apr. 23, 2024

(54) COMPUTER-IMPLEMENTED METHOD FOR ESTIMATING MOVEMENTS OF A CROWD BETWEEN AREAS

(71) Applicants: IMEC VZW, Leuven (BE); UNIVERSITEIT ANTWERPEN, Antwerp (BE)

(72) Inventors: Ben Bellekens, Antwerp (BE); Rafael Berkvens, Schoten (BE); Stijn Denis, Schoten (BE); Maarten Weyn, Hove (BE)

(73) Assignees: IMEC VZW, Leuven (BE); UNIVERSITEIT ANTWERPEN, Antwerp (BE)

( * ) Notice: Subject to any disclaimer, the term of this patent is extended or adjusted under 35 U.S.C. 154(b) by 90 days.

(21) Appl. No.: 17/612,726

(22) PCT Filed: May 20, 2020

(86) PCT No.: PCT/EP2020/064098
§ 371 (c)(1),
(2) Date: Nov. 19, 2021

(87) PCT Pub. No.: WO2020/239582
PCT Pub. Date: Dec. 3, 2020

(65) Prior Publication Data
US 2022/0240053 A1 Jul. 28, 2022

(30) Foreign Application Priority Data
May 24, 2019 (EP) ...................................... 19176519

(51) Int. Cl.
*H04W 4/021* (2018.01)
*H04W 4/029* (2018.01)

(52) U.S. Cl.
CPC ........... *H04W 4/029* (2018.02); *H04W 4/021* (2013.01)

(58) Field of Classification Search
CPC ....... H04W 4/02; H04W 4/021; H04W 4/022; H04W 4/023; H04W 4/029; H04W 24/00;
(Continued)

(56) References Cited

U.S. PATENT DOCUMENTS 9,459,125 B2  10/2016  Wilson et al.
2005/0055568 A1  3/2005  Agrawala et al.
(Continued)

FOREIGN PATENT DOCUMENTS

WO  2014067586 A1  5/2014

OTHER PUBLICATIONS

International Search Report and Written Opinion from PCT Application No. PCT/EP2020/064098, dated Aug. 26, 2020.
(Continued)

*Primary Examiner* — Jean A Gelin
(74) *Attorney, Agent, or Firm* — Workman Nydegger

(57) ABSTRACT

A method for estimating movements of a crowd between a first and second subregion in an area are monitored by a wireless sensor network. The wireless sensor network includes nodes configured to exchange a radio frequency signal through a first respective second link. The first respective second link crosses the first respective second subregion. The method includes the steps of exchanging radio frequency signals over the first and second link; and measuring respective first and second attenuations of the exchanged radio frequency signals over the first respective second link; and estimating based on a change in the attenuations a flow of the crowd between the first and second subregion. The estimating further includes estimating based on the first and second attenuations a density of the crowd
(Continued)

in the first respective second subregion; and estimating based thereon a flux of the crowd between the first and second subregion.

14 Claims, 5 Drawing Sheets

(58) Field of Classification Search
CPC ...... H04W 24/02; H04W 24/04; H04B 47/00; H04B 47/115
See application file for complete search history.

(56) References Cited

U.S. PATENT DOCUMENTS

| | | | | |
|---|---|---|---|---|
| 2011/0040603 A1* | 2/2011 | Wolfe | ................ | G06Q 30/0202 |
| | | | | 705/7.31 |
| 2013/0182904 A1* | 7/2013 | Zhang | ................ | G06V 40/103 |
| | | | | 382/103 |
| 2014/0149094 A1* | 5/2014 | Takeuchi | ............... | G06V 20/53 |
| | | | | 703/6 |
| 2014/0189096 A1* | 7/2014 | Miller | ................ | H04W 4/022 |
| | | | | 709/224 |
| 2014/0372348 A1* | 12/2014 | Lehmann | ............... | G06N 5/04 |
| | | | | 706/12 |
| 2015/0124976 A1* | 5/2015 | Pedersen | ........... | A61N 1/36038 |
| | | | | 381/23.1 |
| 2016/0133025 A1* | 5/2016 | Wang | .................... | G06V 20/53 |
| | | | | 348/135 |
| 2016/0267330 A1* | 9/2016 | Oami | ........................ | G06T 7/20 |
| 2017/0053169 A1* | 2/2017 | Cuban | ................... | G05D 1/104 |
| 2017/0161614 A1* | 6/2017 | Mehta | .................... | G06N 20/00 |
| 2017/0176202 A1* | 6/2017 | Anderson | .......... | G01C 21/3492 |
| 2018/0114416 A1* | 4/2018 | Ichien | ...................... | G08B 7/06 |
| 2019/0035093 A1* | 1/2019 | Oami | ..................... | H04N 23/80 |
| 2019/0049968 A1* | 2/2019 | Dean | ........................ | A61G 5/04 |
| 2019/0104596 A1* | 4/2019 | Den Hartog | .......... | H05B 47/12 |
| 2019/0147711 A1* | 5/2019 | Grom | ....................... | G08B 5/38 |
| | | | | 340/539.13 |
| 2019/0208365 A1* | 7/2019 | Benrachi | ................ | G06Q 50/26 |
| 2019/0266411 A1* | 8/2019 | Oami | ....................... | G06V 20/52 |
| 2019/0304529 A1* | 10/2019 | Wootton | ............. | G11C 11/2259 |
| 2020/0273345 A1* | 8/2020 | Mangal | .................. | G06Q 10/06 |

OTHER PUBLICATIONS

Extended Search Report from corresponding EP Application No. 19176519.7, dated Dec. 5, 2019.

Di Domenico et al., "A Trained-once Crowd Counting Method Using Differential WiFi Channel State Information," Workshop on Physical Analytics, WPA '16, Jun. 26, 2016, pp. 37-42.

Denis et al., "Large Scale Crowd Density Estimation Using a sub-GHz Wireless Sensor Network", IEEE 29th Annual International Symposium in Personal, Indoor and Mobile Radio Communications (PIMRC), Sep. 9-12, 2018, pp. 849-855.

Gupta et al., "Device-Free Crowd Count Estimation Using Passive UHF RFID Technology," Journal of Radio Frequency Identification, IEEE, vol. 3, Issue No. 1, Dec. 18, 2018, pp. 3-13.

* cited by examiner

COMPUTER-IMPLEMENTED METHOD FOR ESTIMATING MOVEMENTS OF A CROWD BETWEEN AREAS

FIELD OF THE INVENTION

The present invention generally relates to detection of movements of people between areas of interest.

BACKGROUND OF THE INVENTION

When a significant number of people are gathering together, such as for example in sports events, festivals and/or concerts, it is meaningful to detect the presence and motions of the people within these premises. Especially from a safety point of view the organizer of an event wants to have an idea of the number of people present within an area of interest, and the way this evolves over time.

During the event, people move within the premises from one area towards another, other people leave the event and new people arrive to join. Generally, these movements are unpredictable such that there is a need to continuously monitor the motion and presence of people. Today, different techniques exist performing such a monitoring like, for example, optical and infrared cameras. However, a shortcoming of using cameras for monitoring a crowd is that privacy issues may arise, this is people are identified which may be undesirable. Furthermore, the use of cameras may lead to false estimations or to situations where no estimation can be made at all. This is, for example, the case when there is insufficient light, like during nightfall and/or when the event takes place indoor, like in a tent.

Another way of monitoring the motion and presence of people is through the use of a wireless sensor network, WSN, throughout which radio-frequency, RF, signals are propagated. Such a WSN network comprises transceiver nodes mutually exchanging RF signals. Through received signal strength, RSS, measurements a crowd density is estimated within the area covered by the nodes. Such a crowd density automation method is disclosed in "*Large Scale Crowd Density Estimation Using a sub-GHz Wireless Sensor Network*" published in 2018 IEEE 29$^{th}$ Annual International Symposium in Personal, Indoor and Mobile Radio Communications (PIMRC), 9-12 Sep. 2018, by Stijn Denis, Rafael Berkvens, Ben Bellekens and Maarten Weyn. A similar system and method are disclosed in U.S. Pat. No. 9,459,125B2. Herein, a system and method are disclosed for device-free motion detection and presence detection within an area of interest in small-scale environments of a limited number of subjects.

Through the transmission of wireless signals as radio waves using a plurality of nodes the presence and motion within an area of interest is estimated. The estimation is performed by observing the change in signal strength, whereby the change is due to the disturbance caused by a person within the area of interest. Furthermore, by comparing an average change in RSS-value a communication link experiences when compared to an empty environment, a crowd density within the area of interest is estimated. Finally, estimated crowd densities over time can be subdivided into categories from low density to high density. Based thereon, an increase or decrease of the people in the area of interest may be derived.

The publication GUPTA GAURANGI ET AL: "Device-Free Crowd Count Estimation Using Passive UHF RFID Technology", IEEE JOURNAL OF RADIO FREQUENCY IDENTIFICATION, IEEE, vol. 3, no. 1, 1 Mar. 2019 (2019 Mar. 1), pages 3-13, discloses two algorithms using spatial and waveform characteristics to predict the number of people crossing a passage with an existing RFID installation.

A problem, however, is that the increase of the crowd density may converge to undesired and unsecure situations without them being observed in a timely manner. It is therefore an object of the present disclosure to improve the method for estimating movements of a crowd known in the art.

SUMMARY OF THE INVENTION

This object is achieved, in a first aspect, by a computer-implemented method for estimating movements of a crowd between a first and second subregion in an area monitored by a WSN comprising nodes configured to exchange a RF signal through a first respective second link, wherein the first respective second link crosses the first respective second subregion, the method comprising the steps of:
- exchanging radio frequency signals over the first and second link; and
- measuring respective first and second attenuations of the exchanged radio frequency signals over the first respective second link; and
- estimating based on a change in the attenuations a flow of the crowd between the first and second subregion;

and wherein the estimating further comprises:
- estimating based on the first and second attenuations a density of the crowd (110-112) in the first (100) respective second (101) subregion; and
- estimating based thereon a flux (140) of the crowd (110-112) between the first (100) and second (112) subregion.

The WSN comprises nodes which exchange RF signals with other nodes. Through the positioning of the nodes, two different links between the nodes arise, namely a first and a second link. The minimum number of nodes within the WSN is thus three, whereby, for example, one node communicates through the exchange of RF signals with the other two nodes. Another possibility is that the three nodes mutually exchange RF signals thereby setting up two separate links. To set-up these links, the three nodes are thus not arranged in one line. A further possibility is that the WSN comprises two pair of nodes, whereby each pair is set up such that a respective link arises. It should thus be understood that two distinct links between nodes arise do not cross each other, whereby different setups with a different number of nodes are possible.

Through these respective links the nodes exchange RF signals. The exchange may be performed through sequentially sending and receiving RF signals, whereby the nodes act both as a transmitting and receiving node. Another possibility is that one node, the transmitting node, transmits the RF signals to another node, the receiving node.

Next, for each link an attenuation of the exchanged RF signals is measured. This is, for the first link a first attenuation is measured, and for the second link a second attenuation is measured. The respective attenuations comprise a difference in signal strength between the transmitted and the received RF signals per link. Finally, based on changes of the attenuations a flow of a crowd between the first and the second subregion is estimated.

When a crowd is moving between the first and second subregion, the respective exchanged RF signals are attenuated due to the physical presence of the people in the crowd. The attenuations are thus not only related to the presence, but also to the movement of the crowd between the two subregions. For example, when a person or a group of persons in an initial situation are in the line-of-sight of the nodes of the first link in the first subregion, these signals are attenuated. Subsequently, when these people move to the second region into the line-of-sight of the nodes of the second link, the signals of the second link get attenuated, while those of the first link become less attenuated compared to the initial situation. The movement of people between the subregions may be more complex. For example, only a part of the people in the first subregion move to the second subregion, while at the same time a part of the people in the second subregion move to the first subregion.

Finally, by exchanging RF signals with a known signal strength between the different nodes through their respective links and subsequently measuring the attenuations of the exchanged RF signals through both links, the flow of a crowd of people between the subregions is related to these attenuations. In other words, the flow between the subregions may be estimated based on the measured attenuations.

A first advantage is that there is no need for people in the crowd to wear a wearable. In other words, people don't have to wear a tag, i.e. an active or passive hardware device worn by targets in tagged localization solutions. Only the influence that the physical presence a person has on a respective link is used to estimate the flow between the subregions. Furthermore, there is no need for optical cameras which could result in privacy issues. In other words, a person doesn't have to give any approval for observing his or her movement. Another advantage is that the method is applicable in indoor environments wherein the amount of useful light emitted by the light sources is insufficient to optically observe the persons and the movements therefrom. Finally, by estimating the flow of the crowd between the subregions an insight is obtained how the amount of people within a subregion evolves in time. This way, a flow of people which would lead to undesired and/or unsafe situations may be observed in a timely manner.

To increase the accuracy of estimating movements between the subregions, multiple links per regions may be used as well. The different links per region are then used for measuring the first respective second attenuations. Further, the attenuations are measured as an average of attenuation per subregion. These averages per subregion are then used and compared with each other to estimate the flow of the crowd between the regions.

The estimating may further be performed considering additional regions or areas, this is more than two subregions. An overall region may thus be subdivided in multiple subregions, whereby each subregion is crossed by one or more links through which RF signals are exchanged. Per subregion the attenuations are measured and based thereon a flow between the different subregions is estimated.

The attenuations are further used to estimate a density of the crowd in the respective subregions by correlating the attenuations per communication link to the number of people present in the area covered by the respective subregion. The surfaces covered by the subregions are thus considered. The respective surfaces may be regarded as the total surfaces covered or may be regarded as the useful surface wherein people can be present, for example by considering a safety coefficient. Next, when a density per subregion is estimated, the flux is determined based on these respective densities. The flux is thus to be regarded as a flow of the crowd per unit of surface. Finally, the flux may then be used to predict a change in density per subregion. This is an advantage, since this way, independently of the size of the surface covered by a subregion, a clear insight is obtained how the change of people within the subregions evolves over time. Numerical values expressing these changes per subregion may then be easily compared with each other.

Instead of numerical values, a density of the crowd in the first and second subregion may further be labelled as low, moderate or high. Next, the flux of the crowd may further be estimated based thereon. Subsequently, based on the flux, a density may further be labelled as increasing, decreasing, stabilizing, or steady. This way, based on the movements, again a clear interpretation is obtained regarding the manner in which the densities evolve over time. An advantage of estimating densities within subregions is thus that the evolution over time through the flux may be represented in a clear and straightforward manner. Another advantage is that they are closely related to the subregions since through the estimating of the densities their respective covered surface is considered.

According to an embodiment, the method further comprises an initialization step of assigning an initial value to the density of the crowd of the first and/or second subregion when respectively detected as unoccupied.

Unoccupied means that the region is not used by a number of people, or even not by one single person. Unoccupied may further mean that the subregion may be equipped with furniture, installations, and/or security or safety equipment. Examples are crush barriers, speakers, counters, or any other object intended to be positioned in a fixed manner. Since an unoccupied subregion may be equipped with a plurality of objects, one or more objects may be in the line-of-sight of the link crossing the subregion, or in case multiple links crossing the subregion. Said objects will attenuate the exchanged RF signals, although they are not related to a movement of a crowd.

Thus, by assigning an initial value to the density when the subregion is unoccupied, the attenuations caused by the configuration of the subregion itself are considered. In other words, the assigning of the initial value is a first calibration step in order for the estimation of the flow or flux in subsequent steps to be performed more precisely. Thus, when a subregion is detected as unoccupied, for example through the perception or observation of a user, an initial value is assigned to the density of the crowd in that subregion. The initial value then comprises a lower value of the density related to the attenuations measured in the unoccupied subregion. The assigning may also be performed automatically for example when the measuring of the attenuations shows a steady value during a predefined time interval. When during this predefined time interval, no changes are of the attenuations are observed, an unoccupied state of the subregion may be derived therefrom, and the initial value is then assigned.

The latter step of automatically assigning an initial value, i.e. an autocalibration step, has an advantage that in cases in which stationary objects turn out to not be stationary during a predefined time period, for example extensive decor-related changes occurring in between shows at a festival, a moment after these changes have occurred can be identified automatically such that the automatic assigning or autocalibration may be performed.

According to an embodiment, the method further comprises the step of determining that the first and/or second subregion is unoccupied by a predefined time schedule and/or by a camera feed.

An unoccupied state may occur during the night, or for example prior to an allowance for entering the premises covered by the subregion by people. The determination of the unoccupied state may then be based on a predefined time schedule. For example, at a predefined point in time during the night when it is with a high level of probability assumed that the subregion is empty. During this point in time the initial value is assigned in an automatic manner.

Alternatively, the assigning of the initial value may be performed by the determination of the unoccupied state by a camera feed. The camera is, for example, a low-resolution camera such that no privacy issues occur, whereby the resolution is still high enough to determine the state of the subregion. This may, for example, be performed when the camera doesn't observe any movement during a predefined time interval thereby concluding therefrom that the subregion is unoccupied. Such a conclusion may, for example, be derived when steady images are captured during a predefined time interval. The method is then triggered to assign the initial value to the density of the subregion.

An advantage of assigning an initial value in an automatic manner through a time schedule and/or a camera feed is that a drift in estimating flows or fluxes may be avoided. In other words, each time an initial value is assigned, the method recalibrates the measuring and estimating steps.

According to an embodiment, the first and/or second subregion is detected as unoccupied when during a predefined time-interval the respective attenuations are below a predefined threshold In other words, a series of RSS measurements may be associated with the unoccupied state of a subregion. When, for example, the RSS measurements or attenuations are below a threshold during a predefined time-interval, the subregion is detected as unoccupied. Next, the assigning of the initial value is then performed. This may, for example, be performed automatically thereby performing an autocalibration.

Assigning an initial value to the density of the crowd of the first and/or second subregion when respectively detected as unoccupied means that a series of RSS measurements is associated with the unoccupied environment.

According to an embodiment, the method further comprises the step of assigning a quantified value to the density of the crowd within the first and/or second subregion.

The method may further comprise a second calibration step wherein a quantified value is assigned to the density of the crowd within a subregion. The quantified value is thus higher than the initial value and comprises an estimated, gauged, or identified number of people within the subregion. The covered surface of the subregion is considered as well thereby determining the density of people within the subregion. The determined value of the density within a subregion is then the assigned quantified value.

Differently formulated, by considering the number of people present in the subregion and the area covered thereof, a quantified value of the density is determined and related to the attenuations measured when determining the assigned value. The value is then assigned such that there is another link besides the initial value between the measured attenuations and the number of people present in the subregion.

An advantage of assigning a quantified value is that the change of density due to the flow or flux may be estimated more precisely. The change of the number of people within the subregions may thus be monitored more correctly.

According to an embodiment, the assigning further comprises assigning a maximum threshold to the density of the crowd allowed within the first and/or second subregion.

For each of the subregions between which movements are estimated via a flow or a flux a maximum threshold may be defined and assigned to the subregions. The maximum threshold may, for example, be the maximum capacity of the subregion in terms a maximum possible density of people per unit of surface, a maximum allowable density of people in terms of safety, or even a maximum allowed density of people in terms of comfort. A safety coefficient may be considered as well. The maximum threshold is then assigned to each subregion that is monitored. This way, by assigning a maximum threshold, an objective or unbiased upper level is defined per subregion such that, when a density is estimated, a direct overview or overall picture is obtained of the current situation. Differently formulated, persons responsible for maintaining the safety within the region get an accurate indication of the margin that is left between the estimated density to the maximum allowable one with needing themselves to make an interpretation thereof.

According to an embodiment, the assigning of the maximum threshold is executed when the first and/or second subregion is respectively detected as fully crowded.

Alternatively, instead of assigning a maximum threshold in advance to a fully crowded situation, the maximum threshold may also manually be assigned when a subregion is detected as fully crowded. This way the measured attenuations are directly linked to the fully crowded situation. The assigning of a maximum threshold in this manner may thus further be regarded as a third calibration step of the method.

When a subregion is detected as fully crowded by responsible persons, the maximum threshold is assigned and further, the responsible persons may decide to temporarily block the entrances towards the subregions. When later on the subregion get less crowded, and people are again allowed, the maximum assigning threshold may further be used for anticipating to a new crowded situation.

According to an embodiment, the method further comprises the step of determining that the first and/or second subregion is fully crowded by a predefined time schedule and/or by a camera feed.

The assigning of a maximum threshold may also be performed in an automatic manner by a predefined time schedule and/or camera feed. This automatic manner is like the step of assigning an initial value. For example, based on a time schedule when it is with a high level of probability assumed that the subregion is fully crowded, the maximum threshold is assigned. Further, a camera feed may be used as well by automatically assigning the maximum threshold when through the camera it is determined that the subregion is fully crowded.

Automatically assigning a maximum threshold through a camera feed may, for example, be performed by using an automatic vision-based crowd estimation technology configured to detect when an environment is at full capacity or fully crowded.

According to an embodiment, the method further comprises the step of calculating the density of the crowd in the first and/or second subregion based on the initial value, quantified value and/or maximum threshold.

By assigning an initial value, a quantified value and/or a maximum threshold in previous steps of the method, the method is calibrated. Next, based on one of these values or a combination thereof, the density of the crowd may be calculated during any point in time. In other words, through the calibration steps, the density may be calculated by relating current measured attenuation with the current density within a region. This is an advantage since this way a continuous overview is obtained of the situations within the subregions.

According to an embodiment, the method further comprises the steps of:

predicting an anticipated density of the crowd of the first and/or second subregion; and triggering an alert when the anticipated density of the crowd exceeds the respective maximum threshold.

The density of the crowd may also be predicted based on the instantaneously calculated density combined with the flux or flow between the subregions. This way, an expected or predicted density, thus the anticipated density, is determined. The anticipated density is thus regarded as the density that will occur in a subregion based on the current movements by the flows or fluxes when there will be no intervention or action taken. The anticipated density may lead to unsafe situations, especially if it exceeds the maximum allowable density within the subregion. Thus, when the anticipated density of the crowd within a subregion exceeds the maximum threshold thereof, an alert is triggered. This way, prior to an unsafe situation, actions may already be taken such that this unsafe situation is avoided.

According to a second aspect, the disclosure relates to a wireless sensor network comprising nodes configured to exchange radio frequency signals for estimating movements of a crowd between a first and a second subregion in an area according to the method according to the first aspect.

According to a third aspect, the disclosure relates to a data processing system programmed for carrying out the method according to the first aspect.

According to a fourth aspect, the disclosure relates to a computer program product comprising computer-executable instructions for performing the method according to the first aspect when the program is run on a computer.

According to a fifth aspect, the disclosure relates to a computer-readable storage medium comprising instructions, when executed by a computer, cause the computer to carry out the steps of the method according to the first aspect.

BRIEF DESCRIPTION OF THE DRAWINGS

Some example embodiments will now be described with reference to the accompanying drawings.

DETAILED DESCRIPTION OF EMBODIMENT(S)

Figure 1:
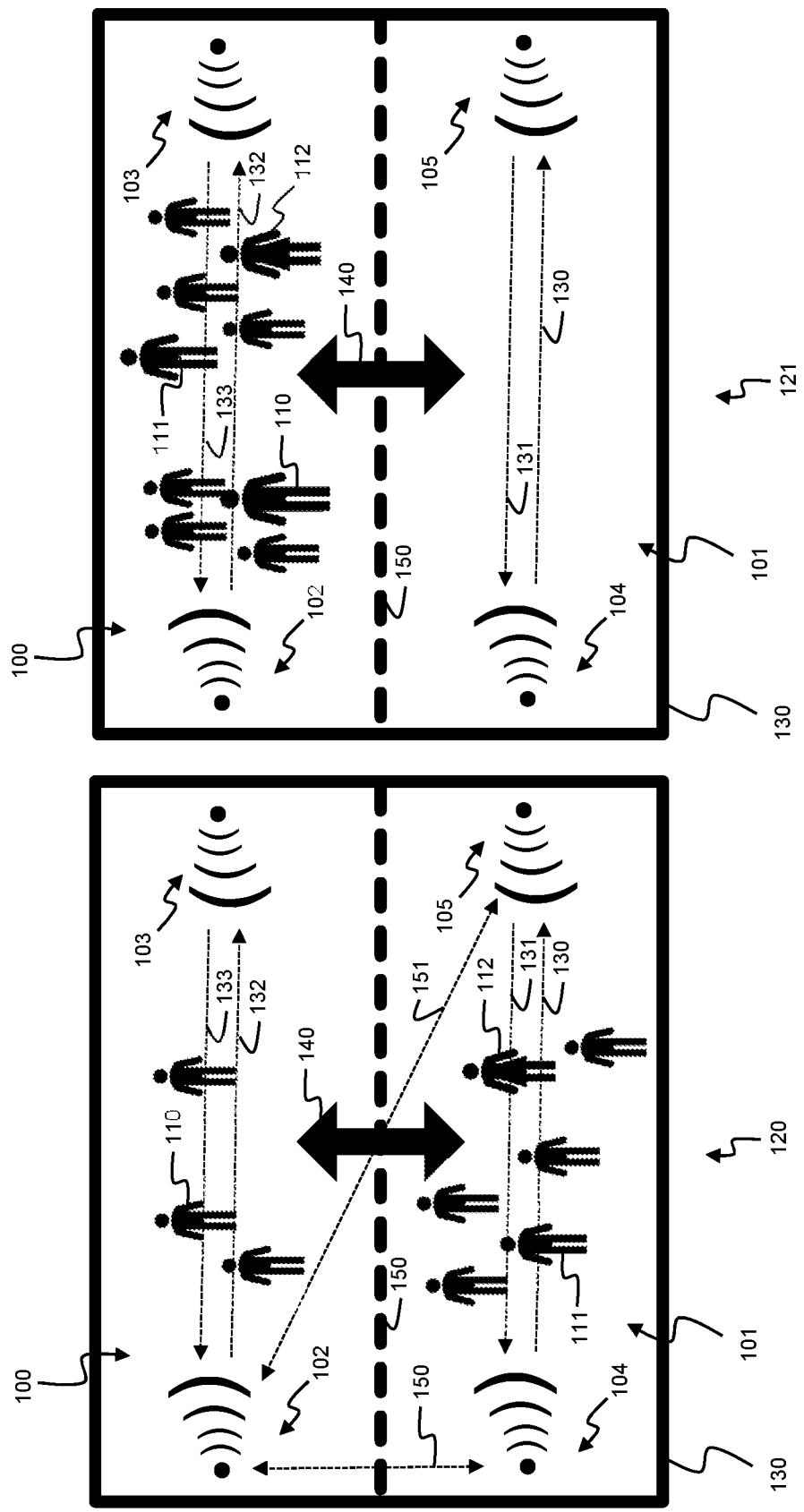
FIG. 1 illustrates two circumstances of an area comprising two subregions monitored by two respective links.

FIG. 1 illustrates an area 130 comprising two subregions, namely a first subregion 100 and a second subregion 101. Within the area 130 people are present, namely a number of men, like man 110 and man 111 and a woman 112. The people, like 110-112, are able to move from the first subregion 100 to the second subregion 101 and vice versa by crossing the border 150 between the subregions 100-101 illustrated by arrow 140. Different circumstances or situations may occur regarding the distribution of people 110-112 over the two subregions 100 and 101 in the area 130. A first situation is illustrated by reference 120. In this situation 120 the majority of people are present in the second subregion 101. In a second situation, illustrated by reference 121, the majority of people are present in the first subregion 100, while in the second subregion 101 there are no persons.

The illustrated area 130 may illustrate an environment whereupon a large-scale crowd event is organised, like a musical festival. The subregions 100-101 then represent different stages or zones within the festival between which people may move. The number of people present in the area may thus be much larger then illustrated in FIG. 1. The subregion 100 may, for example, illustrate a zone near a platform or podium, while subregion 101 may illustrate a zone near an exit of the area.

The subregions 100-101 are monitored by a wireless sensor network comprising nodes. The first subregion 100 is monitored by nodes 102 and 103, while the second subregion 101 is monitored by nodes 104 and 105. The nodes are configured to exchange radio frequency, RF, signals with other nodes within the same subregions. This means that the nodes 102-105 are arranged and configured in such a way that they efficiently communicate with the other nodes in the same subregion. In the first subregion 100, the node 102 is thus configured to exchange RF signals with node 103 through a communication link. This link is illustrated by arrows 132 and 133 representing the back and forward exchange of RF signals between the two nodes 102 and 103. The exchange of RF signals may also be performed in one direction, namely either only from node 102 to node 103, or vice versa. Likewise, in subregion 101, node 104 and node 105 are like nodes 102 and 103 configured to exchange RF signals through a link illustrated by arrows 130 and 131. The first subregion 100 is thus crossed by the first link 132-133 and the second subregion 101 is crossed by the second link 130-131.

Since the nodes 102-105 are arranged in the area 130, a communication link between nodes which are not in the same subregion may likewise occur. This is further illustrated by link 150 between nodes 102 and 104, and link 151 between nodes 102 and 105. Such a communication link may arise through scattering, like communication link 150, or because they are in the line-of-sight of each other, like communication link 151. It should however be understood that the method as disclosed will handle with these communication links through a communication schedule as will be further illustrated.

The nodes may, for example, comprise an IEEE 802.15.4 radio using a 2.4 GHz frequency band for exchanging the RF signals. From the transmitted RF signals of the transmitting node, the signal strength values are known, while from the received RF signals, the signal strength values are measured by the receiving node. In the illustration of FIG. 1 the nodes 102-105 are configured to act both as a transmitting and receiving node, but it should be further understood that the monitoring may be performed through nodes which are configured to solely perform one task, namely either receiving or transmitting RF signals. Other set-ups of the nodes are also possible. As another example, a node may be of the transceiver type comprising a 433 MHz and an 868 MHz transceiver, whereby a frequency band may be used independently of the other one.

Figure 4:
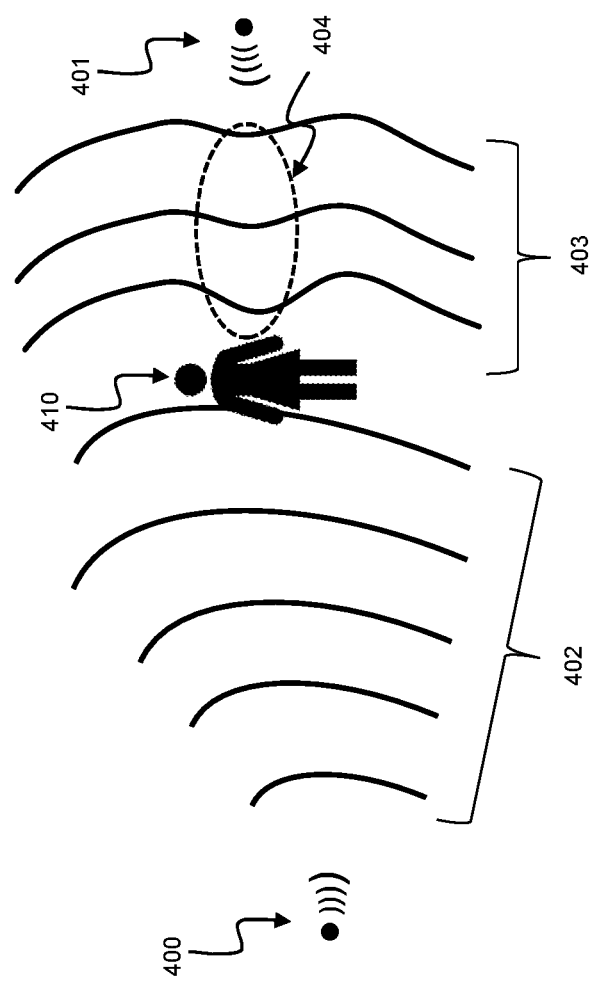
FIG. 4 illustrates an influence of the physical presence of a person on radio frequency signals.

When transmitting a RF signal from a transmitting node to a receiving node, the signal strength of the received RF signal will be less than the signal strength of the transmitted RF signal. The loss in signal strength when propagating in free air may be estimated using a signal path loss propagation model. The loss will be, among others, dependent on the distance between the nodes and the obstacles present in the line-of-sight between the nodes. When a person is positioned in such a line-of-sight, the RF signals will be attenuated more compared to a propagation through free air. This is further illustrated in FIG. 4. Herein, two nodes 400 and 401 exchange RF signals illustrated by waves 402 and 403. In the line-of-sight of the two nodes 400-401 a woman 410 is present. Due to the physical presence, her body 410 will interfere with the waves thereby attenuating them. This is further illustrated by attenuations 404 which will be detected by node 404 through an attenuation in signal strength. The attenuation will then be measured by the node 401.

With again reference to FIG. 1, by measuring changes in the attenuations caused by people present in the subregions 100 and 101, a flow 140 between the subregions 100 and 101 may be estimated. Thus, in the first situation 120, in the second link 130-131 the man 111 and woman 112, together with another number of people attenuate the RF signals exchanged between nodes 104 and 105. In the first subregion 100, the man 110 together with three other men attenuate the RF signals exchanged between nodes 102 and 103 since he 110 is standing in the link 132-133.

In the second situation 121, the conditions are different. In the link 130-131 nobody is present, such that the RF signals are not attenuated by an object or person. In the first subregion 100, the RF signals are now attenuated by all the people present in the area 130. The attenuation in the first subregion 100 is in the second situation 121 thus higher compared to the first situation 120. For the second subregion 101 the attenuation is less in the second situation 121 compared to the first one 120. In other words, between the subregions there is a change in the attenuations which are measured by the nodes 102-105. Finally, based on the change in attenuations a flow 140 between the subregions 100 and 101 is estimated.

Figure 2:
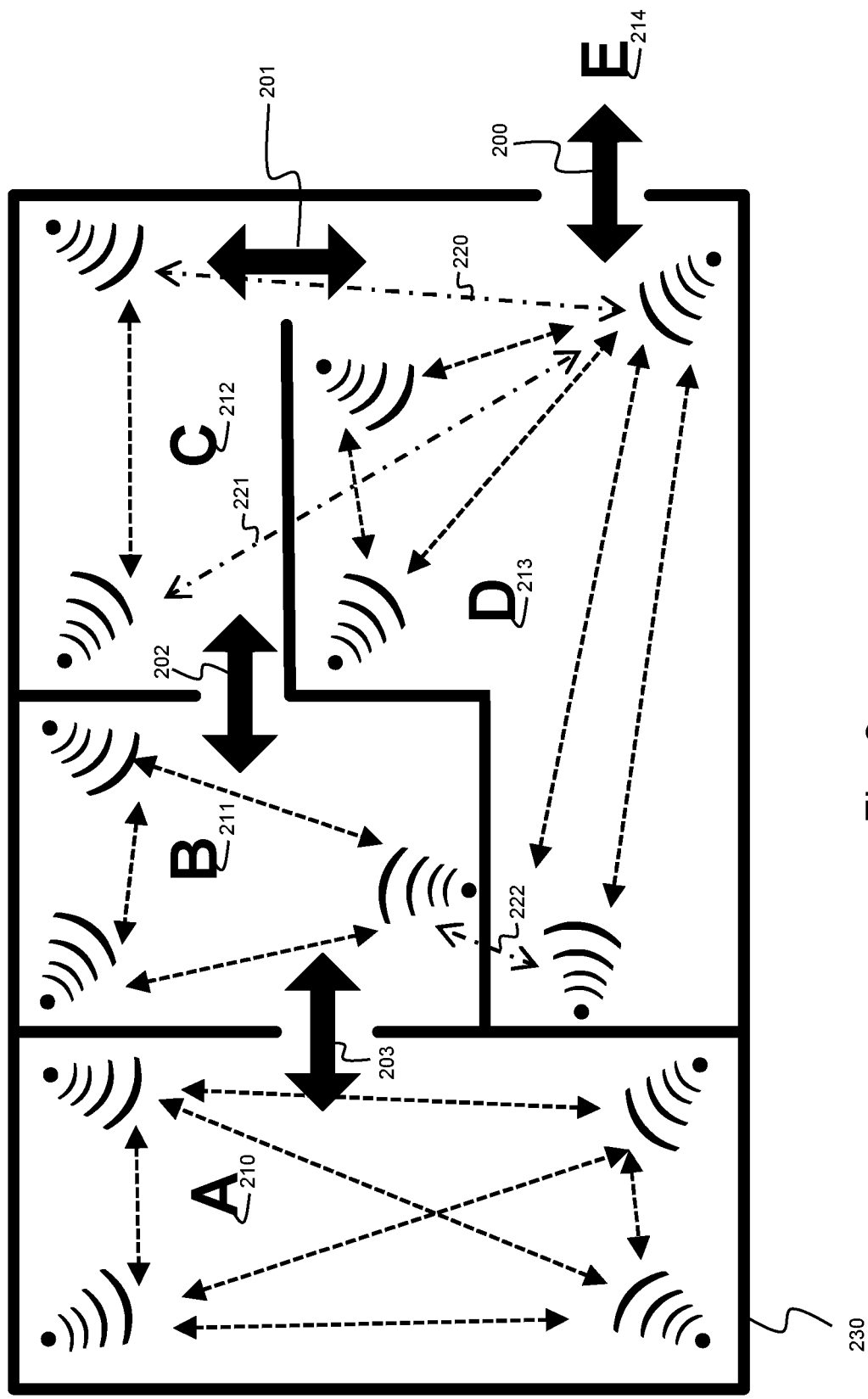
FIG. 2 illustrates an area comprising multiple subregions monitored by a wireless sensor network.

The monitoring of an area by nodes may further be extended to multiple subregions as illustrated in FIG. 2 by the area 230. Thus, instead of two subregions as illustrated in FIG. 1, an area 230 may be further subdivided in subregions A 210, B 211, C 212 and D 213. Each subregion 210-213 is then monitored by a wireless sensor network in a similar manner as already illustrated in FIG. 1. Between the different subregions 210-213 people may move through the different passages 201-203. Furthermore, through entrance 200 people may enter to the area 230 of leave to the outside E 214.

It should be further understood that, although the illustration of FIG. 2 resembles to a schematic floor plan of a building, that this illustration 230 may correspond to a large scale festival terrain, to an exhibition hall, or any other terrain, domain or zone suitable for hosting large scale crowd events. Further, the lines separating the different subregions A 210, B 211, C 212 and D 213 may correspond to walls, screens, or other partitioning means to divide the area into subregions. The illustrated lines may even correspond to virtual separations used for safety reasons to divide the area into zones for monitoring the movements of people between the zones without having to cross physical obstacles.

In FIG. 2 it is further illustrated that per subregion A 210, B 211, C 212 and D 213, more than one link may be present for monitoring a respective subregion. This is further illustrated by the different arrows pointing between the nodes in each of the subregions. Depending on the size and dimension of a subregion, a number of nodes and respective links are thus arranged and positioned in such a way to optimally and efficiently monitoring it.

Likewise, as in FIG. 1, undesired or unusable links in the view estimating flows between subregions may arise as well. These links are, for example, link 200 as the line-of-sight between nodes of different subregions, or links 221 or 222 because the RF signals crosses a boundary between the subregions. Again, the method will handle with these communication links through a communication schedule as will be further illustrated.

In each subregion A 210, B 211, C 212 and D 213, the attenuations are measured. The way attenuations in one subregion are measured will now be further illustrated with reference to FIG. 3. Herein, the subregion 320 is monitored by nodes 300-307, nominated as regular nodes. The illustrated configuration in FIG. 3 further comprises a controller node 308. In a first step, the controller node 308 instructs the first regular node 300 to transmit RF signals to the other nodes 301-307 in the network. The regular nodes 301-307 each receive the transmitted RF signal through the respective links. Next, the nodes 301-307 measure the signal strength of the received signal and report this value to the controller node 308. Next, the controller node 308 instructs the second node 301 in the network to transmit a RF signal, whereby now the other regular nodes 300 and 302-307 receive, measure, and report the signal strength to the controller node 308. The controller node 308 then continues until each node 300-307 has acted as a transmitting node. These steps are continuously repeated such that the subregion 320 is uninterruptedly monitored.

The exchanged signals between the regular nodes 301-307 may further comprise a list of signal strengths previously measured. In other words, the regular nodes 301-307 may continuously exchange this list, and add a measured signal strength when measured. The controller node 308 then continuously listens to the communication between the regular nodes 301-307, thereby obtaining the measured signal strengths in the list. This way, the speed at which consecutive communication cycles occurs is increased. The controller node 308 may further be configured to the network providing to each node the necessary network parameters and a unique identification number. The communication between the controller node 308 and the regular nodes 301-307 may occur on a different channel compared to the exchanged RF signals. This way, a collision on ongoing communication cycles is avoided, for example when a regular node crashes and needs to be rebooted.

Based on the received measurements, the controller node 308 calculates an average attenuation in the subregion 320. Based thereon, a density therein 320 is determined. The determined density may, for example, comprise an estimated value, expressed in number of persons per unit of surface. Alternatively, the density may be determined as unoccupied, partly crowded, or fully crowded. The unoccupied state of the subregion 320 may be determined when during a predefined time-interval the measured attenuations remain stable.

The controller node 308 may instruct the regular nodes 300-307 through a wireless connection, and/or through an interface 310 which is connected to each of the regular nodes 300-307. The interface 310 may further be connected to a network 311. To this network 310 other interfaces may likewise be connected, such as interface 312. Interface 312 is then connected to another controller node and regular nodes monitoring another subregion. It should be further understood that other interfaces and/or controllers may be connected to the network 311 such that a plurality of subregions are monitored.

Figure 3:
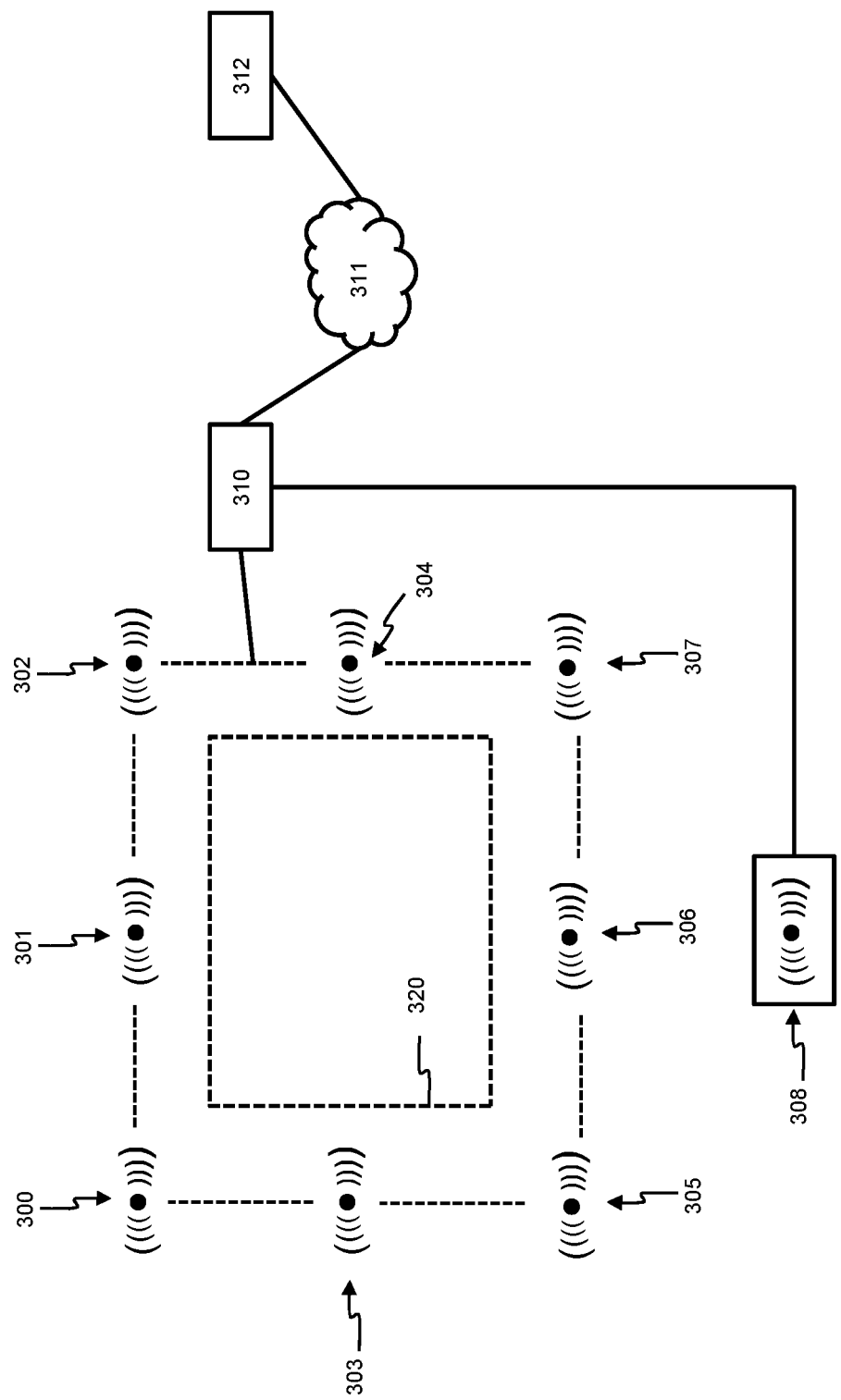
FIG. 3 illustrates a subregion monitored by a wireless sensor network.

When each of the subregions comprises nodes, which do not communicate with nodes of other subregions, like communication links 150, 151, 220, 221, or 222, each of the subregions of an area may be monitored by the configuration as illustrated in FIG. 3. Each subregion is then monitored separately such that the attenuations are measured and subsequently used to estimate a flow between the subregions. In the occurrence that such communication links 150, 151, 220, 221, or 222, occur, the controller node will take this into account as follows.

One controller node controls each node in the monitored area as a regular node. Likewise, each regular node transmits RF signals, while the other nodes receive the transmitted signal. It may thus occur that nodes outside the subregion of this transmitted node receive the RF signal, such as illustrated by the communication link 151. Thus, when node 105 is instructed to transmit RF signals, the node 102 reports a signal strength to the controller node. When the controller node receives this reported signal strength, it will be ignored in calculating the attenuation for subregion 100 and subregion 101, since the link between the node 105 and node 102 doesn't contribute to estimate the flux 140 between the subregions 100 and 101. This way, it is thus avoided that a flow or flux is wrongly estimated.

Figure 5:
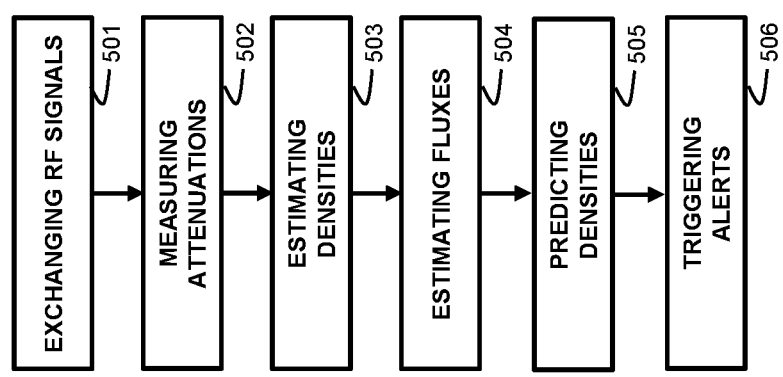
FIG. 5 illustrates steps performed for estimating movements of a crowd between subregions in an area.

With reference to FIG. 5 wherein steps are illustrated for estimating movements of a crowd, the subregions A 210, B 211, C 212 and D 213 illustrated in FIG. 2 are each monitored likewise as the subregion 320 illustrated in FIG. 3 by exchanging 501 RF signals within their respective subregion. Next, the attenuations are measured 502 per subregion are then exchanged through, for example, the network 311. A controller then estimates 503 based on the attenuations densities of people present in the different subregions A 210, B 211, C 212 and D 213. Next, based on changes in the attenuations, flows or fluxes between the subregions A 210, B 211, C 212 and D 213 and out 200 of the area 230 to the outside E 214 are estimated 504. Based on the estimated 504 flows or fluxes, densities are predicted 505 for each of the subregions A 210, B 211, C 212 and D 213. Finally, if a predicted 505 density exceeds a predefined threshold, an alert is triggered 506.

Figure 6:
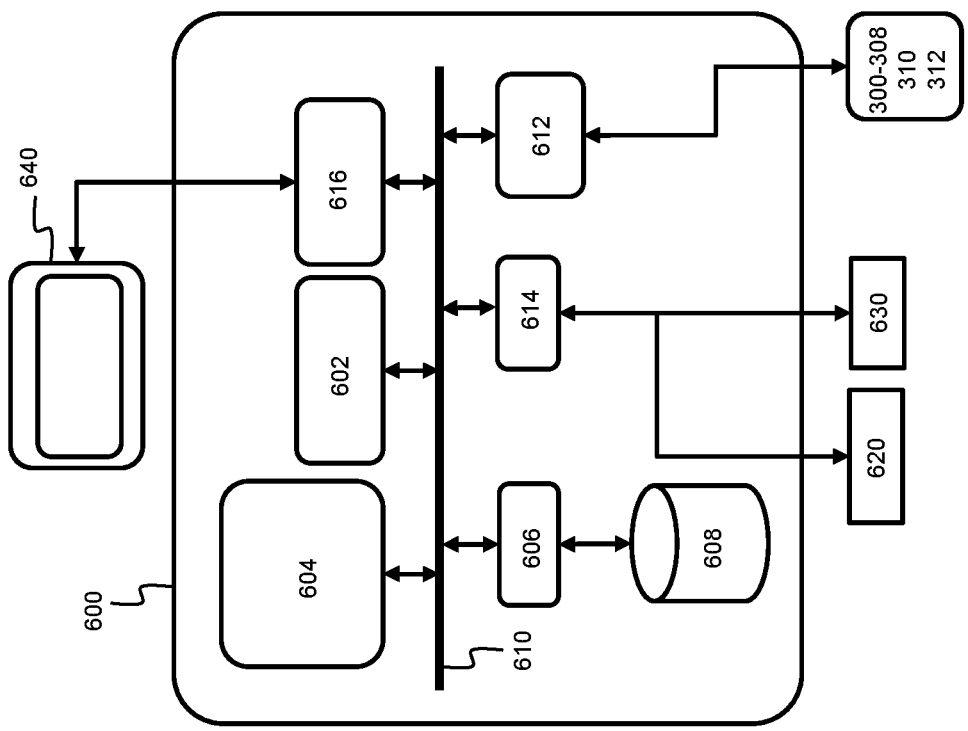
FIG. 6 illustrates a computer system that can be configured to execute one or more embodiments of the method for estimating movements of a crowd between subregions in an area.

FIG. 6 shows a suitable computing system 600 for performing the steps according to the above embodiments. Computing system 600 may be used for estimating movements of a crowd between subregions 100-101 in an area 130. Computing system 600 may in general be formed as a suitable general purpose computer and comprise a bus 610, a processor 602, a local memory 604, one or more optional input interfaces 614, one or more optional output interfaces 616, a communication interface 612, a storage element interface 606 and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory (RAM) or another type of dynamic storage device that stores information and instructions for execution by processor 602 and/or a read only memory (ROM) or another type of static storage device that stores static information and instructions for use by processor 602. Input interface 614 may comprise one or more conventional mechanisms that permit an operator to input information to the computing device 600, such as a keyboard 620, a mouse 630, a pen, voice recognition and/or biometric mechanisms, etc. Output interface 616 may comprise one or more conventional mechanisms that output information to the operator, such as a display 640, etc. Communication interface 612 may comprise any transceiver-like mechanism such as for example one or more Ethernet interfaces that enables computing system 600 to communicate with other devices and/or systems, like nodes 300-308 or interfaces 310 and 312. The communication interface 612 of computing system 600 may be connected to such another computing system by means of a local area network (LAN) or a wide area network (WAN) such as for example the internet. Storage element interface 606 may comprise a storage interface such as for example a Serial Advanced Technology Attachment (SATA) interface or a Small Computer System Interface (SCSI) for connecting bus 610 to one or more storage elements 608, such as one or more local disks, for example SATA disk drives, and control the reading and writing of data to and/or from these storage elements 608. Although the storage elements 608 above is described as a local disk, in general any other suitable computer-readable media such as a removable magnetic disk, optical storage media such as a CD or DVD, -ROM disk, solid state drives, flash memory cards, . . . could be used. The system 600 described above can also run as a virtual machine above the physical hardware.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for estimating movements of a crowd between a first and second subregion in an area monitored by a wireless sensor network, the wireless sensor network comprising nodes configured to exchange a radio frequency signal through a first respective second link, wherein the first respective second link crosses the first respective second subregion, the method comprising the steps of:
exchanging radio frequency signals over the first and second link; and
measuring respective first and second attenuations of the exchanged radio frequency signals over the first respective second link; and
estimating based on a change in the attenuations a flow of the crowd between the first and second subregion; and
wherein the estimating further comprises:
estimating based on the first and second attenuations a density of the crowd in the first respective second subregion; and
estimating based thereon a flux of the crowd between the first and second subregion.

2. The computer-implemented method according to claim 1, further comprising an initialization step of assigning an initial value to the density of the crowd of the first and/or second subregion when respectively detected as unoccupied.

3. The computer-implemented method according to claim 2, further comprising the step of determining that the first and/or second subregion is unoccupied by a predefined time schedule and/or by a camera feed.

4. The computer-implemented method according to claim 2, wherein the first and/or second subregion is detected as unoccupied when during a predefined time-interval the respective attenuations are below a predefined threshold.

5. The computer-implemented method according to claim 1, further comprising the step of assigning a quantified value to the density of the crowd within the first and/or second subregion.

6. The computer implemented method according to claim 1, wherein the assigning further comprises assigning a maximum threshold to the density of the crowd allowed within the first and/or second subregion.

7. The computer implemented method according to claim 6, wherein the assigning of the maximum threshold is executed when the first and/or second subregion is respectively detected as fully crowded.

8. The computer implemented method according to claim 7, further comprising the step of determining that the first and/or second subregion is fully crowded by a predefined time schedule and/or by a camera feed.

9. The computer-implemented method according to claim 5 further comprising the step of calculating the density of the crowd in the first and/or second subregion based on the initial value, quantified value and/or maximum threshold.

10. The computer implemented method according to claim 5, further comprising the step of:
predicting an anticipated density of the crowd of the first and/or second subregion; and
triggering an alert when the anticipated density of the crowd exceeds the respective maximum threshold.

11. A wireless sensor network comprising nodes configured to exchange radio frequency signals for estimating movements of a crowd between a first and a second subregion in an area according to the method of claim 1.

12. A data processing system comprising means for carrying out the method according to claim 1.

13. A computer program product comprising instructions which, when the program is executed on a computer, cause the computer to carry out the method according to claim 1.

14. A non-transitory computer-readable storage medium comprising instructions that, when executed by a computer, cause the computer to carry out the steps of the method according to claim 1.

* * * * *